(12) United States Patent
Halder et al.

(10) Patent No.: US 7,239,131 B2
(45) Date of Patent: Jul. 3, 2007

(54) SENSOR ELEMENT FOR REVOLUTION COUNTER

(75) Inventors: Ernst Halder, Renningen (DE); Marco Diegel, Jena (DE); Roland Mattheis, Jena (DE); Klaus Steenbeck, Jena (DE)

(73) Assignee: Horst, Siedle, GmbH & Co. KG, Furtwangen (DE)

( * ) Notice: Subject to any disclaimer, the term of this patent is extended or adjusted under 35 U.S.C. 154(b) by 1 day.

(21) Appl. No.: 10/525,518

(22) PCT Filed: May 30, 2003

(86) PCT No.: PCT/EP03/05675

§ 371 (c)(1),
(2), (4) Date: Feb. 24, 2005

(87) PCT Pub. No.: WO2004/020952

PCT Pub. Date: Mar. 11, 2004

(65) Prior Publication Data

US 2005/0237054 A1    Oct. 27, 2005

(30) Foreign Application Priority Data

Aug. 30, 2002   (DE) .............................. 102 39 904

(51) Int. Cl.
*G01B 7/30* (2006.01)
*G01B 7/14* (2006.01)

(52) U.S. Cl. ..................... 324/207.21; 324/207.25; 324/252

(58) Field of Classification Search .................. None
See application file for complete search history.

(56) References Cited

U.S. PATENT DOCUMENTS 5,475,304 A * 12/1995 Prinz ..................... 324/207.21
6,219,212 B1   4/2001 Gill et al.

FOREIGN PATENT DOCUMENTS

| DE | 197 46 199 A1 | 4/1999 |
|---|---|---|
| EP | 0 721 563 B1 | 6/2000 |
| WO | WO 00/17660 A | 3/2000 |

OTHER PUBLICATIONS

International Search Report (PCT/ISA/210).
International Preliminary Examination Report (PCT/IPEA/409).
European Office Action dated Oct. 26, 2006.

* cited by examiner

*Primary Examiner*—Jay M. Patidar
(74) *Attorney, Agent, or Firm*—Harness, Dickey & Pierce

(57) ABSTRACT

The invention concerns a sensor element (11) designed in particular for a revolution counter (10). It is possible to pass a magnetic field in front of said sensor element (11). The latter (11) has a laminated structure (2) and a shape (30) such that power supply is not needed to cause a modification of magnetization in the sensor element (11) when the magnetic field passes in front thereof, and in that several such modifications can be stored.

30 Claims, 4 Drawing Sheets

SENSOR ELEMENT FOR REVOLUTION COUNTER

STATE OF THE ART

The invention concerns a sensor element, especially for a revolution counter, whereby a magnetic field can be moved past the sensor element.

For example, providing an angle sensor with which the exact angle setting of the steering shaft can be measured is known in connection with the steering shaft of a motor vehicle. Such an angle sensor is known from EP 0 721 563 B1. There an angle sensor is described in which a domain wall is generated in a stationary magnetic laminated structure by two swiveling magnets. The angle setting which the two magnets are occupying can then be ascertained with the aid of the Giant Magneto Resistance (GMR) Effect.

The sensor element of EP 0 721 563 B1 is only suited for recognizing an angle setting inside an angle range of less than 360 degrees. The known sensor element is nonetheless not in a position to recognize several revolutions of the two magnets. The rotation counter with which the number of revolutions of the two magnets can be ascertained can for this reason not be realized with the known sensor element.

Since nonetheless the steering shaft of a motor vehicle can be rotated by several revolutions, it is necessary to provide a rotation counter in addition to the angle sensor, which is in a position to indicate the exact number of revolutions by which the steering shaft has been rotated. Frequently such a rotation counter is combined with an angle sensor so that the rotation setting of the steering shaft can be indicated with respect to the number of rotations as well as with respect to the angle setting.

For example, non-contacting rotation counters are known in which a magnetic field is moved by a sensor element. The magnetic field is, for example, generated by a permanent magnet which is installed on the steering shaft of the motor vehicle and is rotable with this. The sensor may, for example be a Hall sensor which consequently generates an electric signal each time the magnetic field is moved past it. It is possible to infer the number of revolutions about which the steering shaft has been rotated as a function of these signals.

The disadvantage of the known revolution counters consists in that an energy supply must be available for their operation. Hence, it is for example necessary to supply the Hall sensor with a voltage, so that a signal can be generated from this if a magnetic field moves past it.

The known revolution counters are consequently no longer functional when the energy supply fails and must be reset to the, possibly altered number of revolutions by additional measures in the event of such a failure.

Here it should be mentioned for the sake of completeness, that of course not only the magnetic field can be moved by the sensor element, but rather that conversely as well the sensor element can be moved past the magnetic field.

OBJECTIVE, SOLUTION AND ADVANTAGES OF THE INVENTION

The objective of the invention is to create a sensor element, especially for a revolution counter that is also in a position without an energy supply, to indicate the exact number, for example, of revolutions, about which, for example, the steering shaft has been rotated.

This objective is accomplished in accordance with the invention by a sensor element, especially for a revolution counter, in which a magnetic field can be moved past the sensor element, and that has a laminated structure and a form that are suited without an energy supply to cause a change in the magnetization of the sensor element if the magnetic field is moved past the sensor element, as well as store several changes of this type.

The invention is likewise realized through a revolution counter in which the sensor element of the invention is realized.

In the case of the invention, a change of magnetization arises in the sensor element if the magnetic field is moved by the sensor element. This change of magnetization is stored by the sensor element. If the magnetic field is moved past the sensor element several times, several changes of magnetization are stored in the sensor element. The number of stored changes consequently corresponds to the number which indicates how often the magnetic field is moved past the sensor element. As is yet to be explained, these stored changes of magnetization represent a change in the character of the sensor element that can be recognized or measured with the aid of known methods.

In the case of a revolution counter in which the magnetic field is moved once past the sensor element with each rotation, the number of the changes in magnetization stored in the sensor element consequently corresponds to the number of revolutions counted.

It is essential, that the change in magnetization is reached without any external energy supply with the sensor element of the invention. Instead, the change in magnetization of the sensor elements is attained through its laminated structure and its configuration alone.

The invention consequently furnishes a sensor element, in particular for a revolution counter that makes possible a continuous, non-contacting recording of the number, for example, of revolutions without an energy supply being necessary for this. Even with a failure of the energy supply, the sensor element of the invention remains functional without further measures. Consequently, no measures for the continued correct operation of the sensor element must be taken following a failure of the energy supply of this type.

In an advantageous further development of the invention, a domain wall arises in the sensor element, in particular a 360° wall, if the magnetic field is moved past the sensor, whereby several 360° walls can be stored in the sensor element.

If the magnetic field is moved past the sensor element (or the reverse), the magnetization in the magnetic laminated structure of the sensor element changes. This change of magnetization can, for example, be the generation of a domain wall or the remagnetization of a surface in the sensor. In a domain wall, the magnetization revolves on narrow space, for example, by 90°, 180°, or 360° (so-called 90°, 180°, and 360° wall). Of these domain walls, the 360° wall is the most stable configuration against external magnetic fields. An especially advantageous configuration of the invention anticipates the generation and storage of 360° walls in the magnetic laminated structure.

If the magnetic field is moved past the sensor element of the invention (or the reverse), a domain wall is generated inside of the magnetic laminated structure due to the geometric form and the magnetic properties of the sensor element. After reversing the magnetic field, this domain wall has changed into a 360° wall. The direction of rotation inside the 360° wall follows the direction of rotation of the magnetic field toward the sensor element. If the magnetic field is rotated in the opposite direction, a 360° wall is built up, whose direction of rotation likewise is in the opposite direction.

As was mentioned, a 360° wall is generated and stored in the sensor element in this preferred solution according to the invention if the magnetic field is rotated once about the sensor element (or the reverse). This means that after a rotation, for example of a steering shaft provided with a suitable permanent magnet, precisely a 360° wall is generated and stored in the sensor element in this solution of the invention.

No energy supply is necessary for generating, and maintaining, or storing the domain wall. Only a sufficiently large magnetic field, a suitable geometrical form, and suitable magnetic properties at least of parts of the sensor element are necessary.

In an advantageous further development of the invention, the sensor element is configured such, that it can store more than a 360° wall. Hereby, continuously to all rotations, for example corresponding to the steering shaft as many 360° walls can be generated and stored in the sensor element. As already mentioned, a 360° wall is built up whose direction of rotation is likewise in the opposite direction if the magnetic field is rotated in the opposite direction. 360° walls cancel each other out when they collide.

It is guaranteed on the basis of the geometric structure and the magnetic properties of the sensor element of the invention that 360° walls rotating in opposite directions meet and therewith mutually extinguish each other. A zero position can be allocated to the sensor element of the invention due to this property from which it can count revolutions counterclockwise and clockwise. The sensor element registers all revolutions, but counts only the number of revolutions that are currently left over. This means, that the sensor element of the invention always shows the amount of the difference between the number of clockwise revolutions minus the number of counterclockwise revolutions. For example, if precisely a 360° wall for a clockwise revolution is stored in the sensor element after four clockwise revolutions and subsequently three counterclockwise revolutions which indicates the current rotation of the steering shaft in relation to the zero position.

No energy supply is necessary for generating and storing changes in magnetization, especially of 360° walls. Consequently an energy failure has no effect upon the registration and counting of a revolution, for example, of the steering shaft. The sensor element of the invention counts revolutions now as before, during an energy failure. The current number of revolutions cannot be read out during an energy failure under certain circumstances. As soon as the energy supply is present once again following the failure, the current number of revolutions can nonetheless be read from the sensor element again without further measures.

As was already mentioned, the stored changes in magnetization represent a change in character of the sensor element. Preferred solutions in accordance with the invention use the electrical resistance of the sensor elements for recognizing or measuring this change in property and therewith for reading out the sensor element.

Magneto-resistant materials and laminated structures are known in which a change in magnetization causes a relatively large and therewith well measurable change in resistance. Layer stacks which have the Giant Magneto Resistance (GMR) Effect or the Tunnel Magneto Resistance (TMR) Effect are especially preferred. The feature of this layer stack are two magnetic layers, or layer stacks one of which is magnetically soft, and the other is magnetically hard, and which are separated from each other by a non-magnetic metal layer (GMR effect), or an insulation layer (TMR effect). The magnetization of the magnetically soft layer is altered by the outer magnetic field while the magnetization of the hard magnetic layer remains unchanged. In order to make the magnetization of the hard magnetic layer very hard, it can be in contact with an anti-ferromagnetic, or an artificial anti-ferromagnet, or ferromagnet.

With the GMR effect and the TMR effect electrical resistance is dependent upon the directions of magnetization of the two magnetic layers in relation to each other. The resistance is minimal when the magnetizations are parallel and maximal when they are anti-parallel. The cause of this is the spin-dependent scatter of electrons in these materials, therefore such layer stacks are also designated as spin valves. The hereby caused magneto-resistive resistance can for example reach 10% with typical GMR systems and 40% with typical TMR systems.

Preferred solutions in accordance with the invention use a spin valve as magnetic structure based on the GMR or TMR effect. In this way, the change in magnetization in the sensor element caused by the revolution of the outer magnetic field, for example a 360° wall, is converted into a well measurable change in resistance.

This electrical resistance can be ascertained directly or indirectly by a corresponding electric circuit. The resistance ascertained or a magnitude derived from it then corresponds to the number in rotations about which, for example, the steering shaft has been rotated. To the extent that an energy supply is necessary for determining the electrical resistance or the magnitude derived from this, the number in revolutions—as already mentioned—cannot be determined during an energy failure. Nonetheless, after the energy failure, the correct and current number of revolutions yields the determination of the electrical resistance of the electrical resistance or the amount derived from it again immediately without any additional measures.

The sensor element has a wall generator and a wall storage unit in an advantageous configuration of the invention. The wall generator is moreover responsible for generating domain walls, especially 360° walls, and the wall storage unit is responsible for storing the walls generated.

It is especially advantageous if the wall generator is constructed such, that the direction of magnetization in the wall generator can easily follow a moving, external magnetic field. The wall generator is preferably constructed in a circular form. Furthermore it is especially advantageous if the wall storage unit is constructed such, that the direction of magnetization in the wall storage unit can hardly be rotated by a moving, external magnetic field. Preferably the wall generator is constructed oblong.

In an especially advantageous configuration of the invention, the wall storage unit tapers wedge-like away from the wall generator. This makes possible a minimization of energy owing to the shortened wall length, so that the currently forming 360° wall is moved toward the tip of the wall storage unit.

In an advantageous configuration of the invention, there is a constriction in which at least one wall can be localized. The localization takes place on the basis of the shortening of the wall length and the energy gain attained therewith. Alternatively, this constriction can also be so narrow that the domain wall is localized before the constriction; that is, the magnetization does not rotate within the constriction. The aforementioned wedge shape of the wall generator is advantageous for this.

An especially advantageous configuration of the invention provides that for each revolution to be counted exactly one suitably dimensioned constriction is provided in the wall storage unit in which precisely one domain wall is localized.

These constrictions are configured in such a way, that the currently forming domain walls can move through it, in as far as this constriction is not occupied with a wall.

Instead of a constriction, a further advantageous configuration of the invention provides that the wall storage unit has at least one selectively installed locally restricted change in magnetic properties. By these changes it is achieved, that the walls preferably settle on the points of the changes.

A further advantageous configuration of the invention provides for the combination of constriction(s), and local change(s) for localizing the wall(s).

In a further advantageous configuration of the invention, the wall storage unit has two contacts. The number of walls stored in the wall storage unit can be determined through these contacts, especially through a measurement of electric resistance.

It is advantageous if the contacts are arranged such, that all walls maximally situated or localized in the wall storage unit, and at the same time the areas not filled with domain walls between the contacts are minimal. In this way, it is guaranteed that when the number of walls stored in the wall storage unit is determined, in fact all walls present there are recorded, and that the measuring signal is as large as possible.

A further advantageous configuration of the invention provides the combination of the above configurations so that for each revolution to be counted precisely one suitably dimensioned constriction and/or change in the wall storage unit is provided, into which exactly one domain wall is localized and at least one contact is provided alongside each constriction and/or change so that each localization position can be read out individually. This configuration makes possible a high measuring signal and a quasi digital storage of the counted revolutions.

An especially advantageous configuration of the invention provides, that the wall storage unit is shielded from the external magnetic field that causes the magnetization change in the wall generator. The shielding assures, that the walls in the wall storage unit can move only on the basis of geometric form and the magnetic properties of the wall storage unit as well as the influence of the magnetization in the wall generator.

Advantageous embodiments provide for this shielding to be realized by at least one magnetic layer through the wall generator.

Alternative embodiments of the solution of the invention store various magnetization arrangements, for example variously large unmagnetized surfaces instead of domain walls, especially instead of the 360° walls, to which then clearly revolutions can be allocated to.

It is especially advantageous for determining the number of revolutions, if the electric circuit has a Wheatstone bridge with four sensor elements. In this way, a great exactitude is reached with little expense.

An especially preferred application of the sensor element of the invention or of the revolution counter of the invention exists in motor vehicles.

Further features, possible applications, and advantages of the invention emerge from the following description of embodiments of the invention that are represented in the figures of the drawings. Hereby all features described or represented form the object of the invention by themselves or in any combination, independently of their summary in the patent claims, or their reference to, as well as independent of their formulation, or representation in the description, or in the drawings.

EMBODIMENTS OF THE INVENTION

Figure 1:
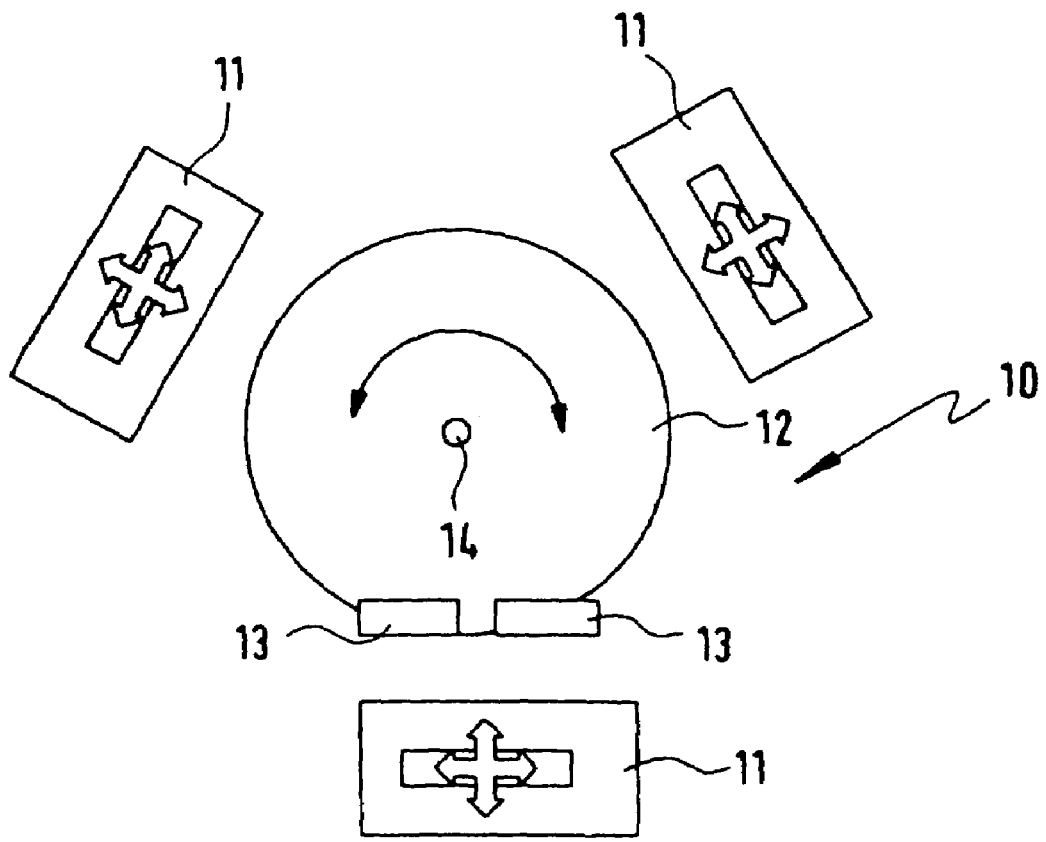
FIG. 1 illustrates a schematic top view on an embodiment of a revolution counter with three sensor elements of the invention.

A revolution counter 10 is represented in FIG. 1 which has three stationary sensor elements 11, and a rotor 12 with two permanent magnets 13 installed thereon adjacent to each other. The rotor 12 is rotable about an axis 14. The sensor elements 11 are arranged at an angle of, for example, about 120 degrees to one another. The sensor elements 11 are allocated to the rotor 12 in such a way, that the magnetic field of the permanent magnets 13 is moved past the sensor element 11 in a rotation of the rotor 12, and recorded by each of the sensor elements 11.

The revolution counter 10 is provided for non-contact counting of, for example, up to ten revolutions of the rotor 12 (or five revolutions in both directions) by the sensor elements 11. As will be described, counting the revolutions is possible here without an external energy supply.

The three sensor elements 11 are constructed in the same way. For this reason, only a single one of the sensor elements 11 will be described below.

It is obvious that with the revolution counter 10 of FIG. 1, the permanent magnets 13 are also arranged stationarily, and the three sensor elements 11 can be provided rotably about the axis 14, so that in this case the magnetic field of the permanent magnets 13 is moved by the sensor elements 11.

Counting the revolutions by the sensor element 11 takes place by utilizing the Giant Magneto Resistance (GMR) Effect, or the Tunnel Magneto Resistance (TMR) Effect. Alternatively it is likewise possible to determine the number of revolutions counted by the sensor element 11 with the aid of the magneto-optical and/or magneto-strictive method.

Figure 2A:
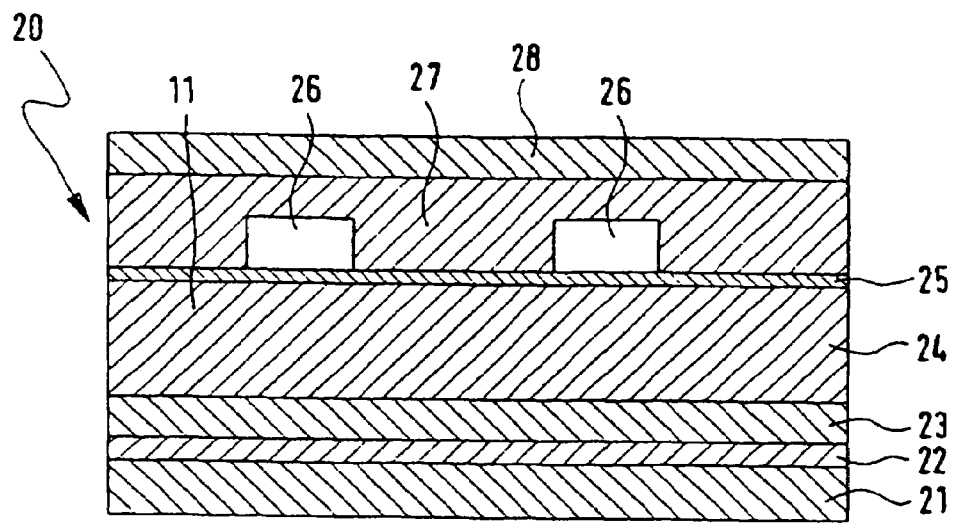
FIGS. 2a and 2b illustrate schematic cross sections through one of the sensor elements of FIG. 1.

FIG. 2a depicts a laminated structure 20 of the invention of the sensor element 11, which uses the GMR effect for reading out the counted revolutions. A soft magnetic layer 21 is separated by a thin non-magnetic metal layer 22 of a hard magnetic layer 23. An anti-ferromagnetic layer 24 on the hard magnetic layer 23 serves to make the latter magnetically even harder. This means, that the magnetization in the hard magnetic layer 23 cannot be altered by the magnetic field of the permanent magnets 13 as opposed to the magnetization of the soft magnetic layer 21. A contacting layer 25 is on the layer 24 on which two contacts 26 are applied. The measuring current flows between the two contacts 26 horizontally and vertically through the entire laminated structure 20, thus through layers 21, 22, 23, 24, and 25.

Figure 2B:
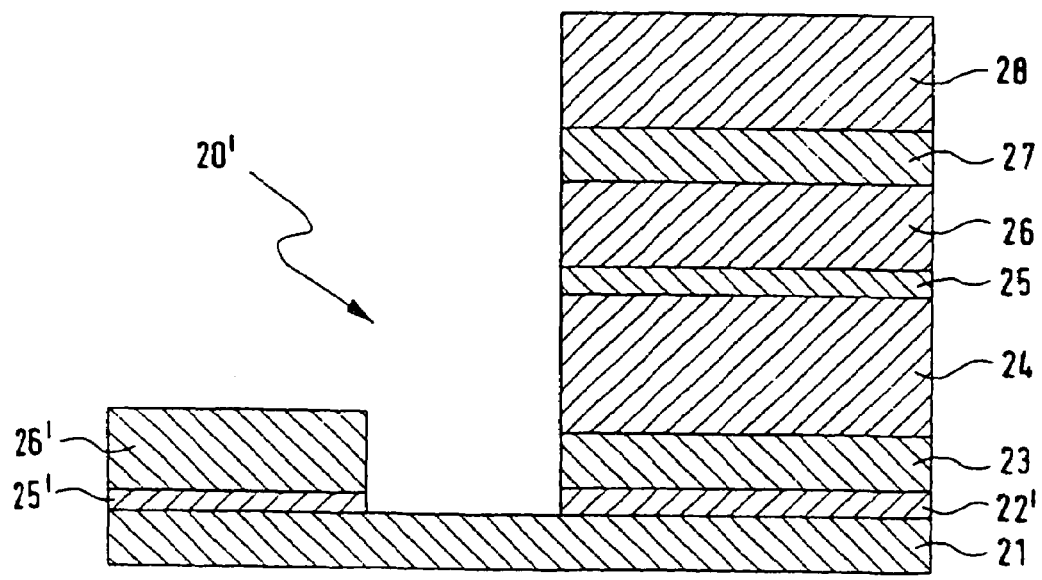

FIG. 2b shows a laminated structure 20' of the sensor element 11 in accordance with the invention that uses the TMR effect for reading out the counted revolutions. The following changes resulted as compared to FIG. 2a. The non-magnetic metal layer 22 is replaced by an insulation layer 22' which represents a tunnel barrier. One of the two contacts 26 is replaced by a contact 26'. This contact 26' is situated either directly on the soft magnetic layer 21 (not depicted), or preferably on a contact layer 25' on the soft magnetic layer 21. That means, that for applying the contact 26', the layer stack 20' must be etched off locally up to the soft magnetic layer 21. This takes place preferably in a lateral region. The measuring current flows for example over contact 26 vertically through the layers 25, 24 (anti-ferromagnetic layer), 23 (hard magnetic layer), 22' (tunnel barrier), up to the soft magnetic layer 21, in order to subsequently flow horizontally in relation to the contact layer 25', as well as in relation to contact 26'.

As is yet to be explained, the contacts 26, 26' can be contained in an insulation layer 27 that is covered by a cover layer 28.

The overall laminated structure 20, 20' can, for example, be mounted on an (oxidized) silicon layer. Such a laminated structure 20, 20' is also designated as a spin valve.

Figure 3:
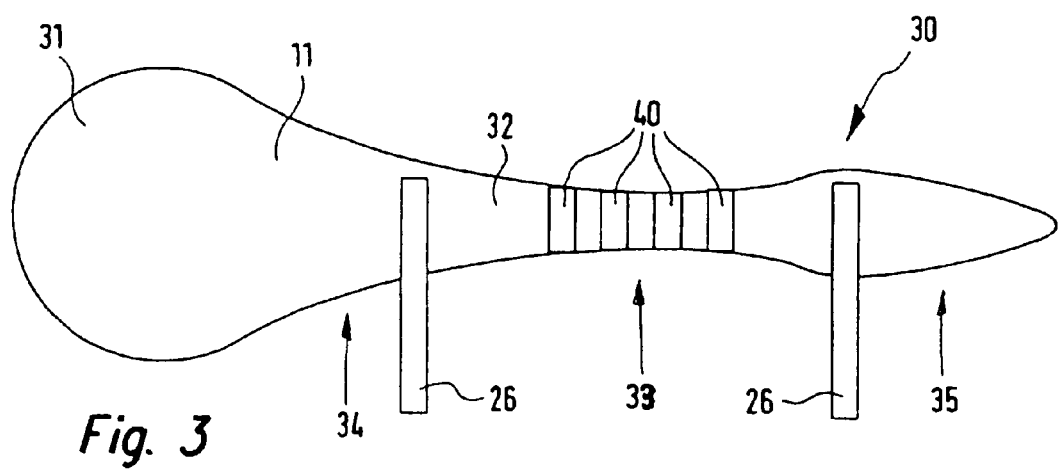
FIG. 3 illustrates a schematic top view onto the sensor element of FIG. 2.

A geometric configuration in accordance with the invention of the sensor element 11 is represented in FIG. 3 in a top view. The sensor element 11 possesses an oblong, clock hand form 30, and is constructed mirror-symmetrically to a longitudinal axis (not represented).

In the left region of FIG. 3, the sensor element 11 has a wall generator 31. This is constructed as a circle in FIG. 3, but it could also be configured octagonally, or quite generally polygonally. The cover layer 28 is not present in the region of the wall generator 31.

Due to the shape and size of the wall generator 31, its magnetization direction can easily follow a moving, outer magnetic field of the permanent magnet 13. This is attained with the wall generator 31 of FIG. 3, especially due to its circular construction.

A wall storage unit 32, that is constructed long and narrow, is joined to the wall generator 31 with a rounded off transition. Due to this configuration of the wall storage unit 32, and the form anisotropy resulting from it, the magnetization inside the wall storage unit 32 hardly rotates through the moving outer magnetic field of the permanent magnet 13.

The cover layer 28 is present in the region of the wall storage unit 32. The influence of the magnetic field is further diminished by the cover layer 28. This can be a magnetic shield layer, for example from permalloy.

The wall storage unit 32 has a constriction 33, which is situated approximately centrally between the contacts 26. The anterior part 34 of the wall storage unit 32 tapers conically up to the constriction 33. A narrow tip 35 of the wall storage unit is situated behind the constriction 33. The tip 35 is configured such, that its magnetization, for example on the basis of form anisotropy, does not change. Due to this shape of the wall storage unit 32, domain walls are situated inside the constriction 33 between the contacts 26. This is represented in FIG. 3 by four so-called 360° walls 40.

Instead of the constriction 33, it is possible to provide one or more selectively inserted locally restricted changes in the magnetic properties of the wall storage unit 32, in order to achieve a localization of the walls 40 this way. Therefore, the magnetic properties of the soft magnetic layer in particular can be altered in such a way, that the walls 40 preferably settle at these places. The changes in the magnetic properties can, for example, be holes, selectively local dopings, or manipulations of individual crystallites, or grain boundaries, for example, by local heating with a laser beam in at least one layer of the laminated structure 20.

Preferred realizations provide on and/or beneath, and/or alongside the soft magnetic layer of the laminated structure 20 at least one locally delimited hard magnetic layer, for example as a narrow strip transversely across the wall storage unit 32. The localization of he wall/walls 40 rests upon the locally restricted interaction of this hard magnetic layer with the soft magnetic layer of the wall storage unit.

Such 360° walls 40 are attained by the arrangement in opposing direction of the permanent magnets 13 on the rotor 12. If these permanent magnets 13 are moved clockwise past the sensor element 11, then the first magnet generates a 180° wall in the soft magnetic layer 21, that is transported due to the shape of the sensor element 11 into the wall storage unit 32, and there into the constriction 33. The second magnet generates a second, opposite 180° wall with the same direction of rotation in the soft magnetic layer 21, which is likewise transported into the construction 33. Since these two 180° walls lie spatially close next to each other, they form a 360° wall 40.

Figure 4:
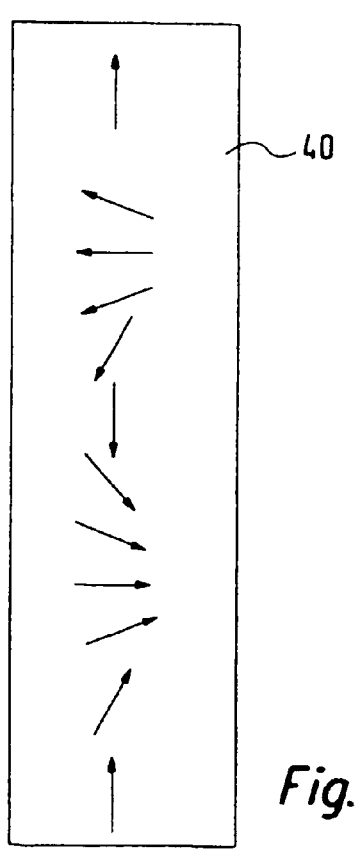
FIG. 4 illustrates a schematic representation of the magnetization of a so-called 360° wall of the sensor element of FIG. 2.

Such a rotation of the direction of magnetization about 360° is schematically represented in FIG. 4. The arrows shown there reproduce the directions of magnetization in the affected part of the 360° wall 40. The width of the 360° wall 40 amounts to only a few 10 nm–100 nm, that is, only a dozen to 100 crystallites. The length depends upon the width of the wall storage unit 32.

Owing to the wedge shape, the 360° wall can shorten its length, and thereby minimize its energy. For this reason the wedge shape of the anterior part 34 of the wall storage unit 32 transports the 360° walls 40 into the constriction 33. This it is optimal energetically for the 360° walls 40 to be localized inside the constriction 33. Conversely, it is not optimal for the 360° walls to be situated in the wall generator 31.

Each of the 360° walls consequently runs automatically from the wall generator 31 via the wedge-shaped part 34 to the wall storage unit 32, and remains standing there approximately in the constriction 33. This takes place on account of the respective energy states, which run through the 360° wall 40. Here the 360° 40 wall possesses a greater energy in the area of the wall generator 31, than in the area of the wall storage unit 32. The 360° wall possesses the least energy in the area of the constriction 33.

The tip 35 is a hindrance for the 360° wall 40. It effects, that the 360° walls 40 cannot run through forward and be nullified there. Overall the 360° walls 40 for this reason (as mentioned) move from the wall generator 31 into the constriction 33 of the wall storage unit 32 and remain there.

After the permanent magnets 13 have been moved by the sensor element 11, a remaining change in the magnetization of the sensor element 11 has consequently taken place, and indeed in the region of the constriction 33 of the wall storage unit 32. This represents a change in characteristic of the sensor element and therewith a storage of the change in the magnetization in the sensor element 11.

In FIG. 3 a total of four such 360° walls 40 are drawn in by way of example in the constriction 33 of the wall storage unit 32. These four 360° walls 40 here results for example from four successive clockwise revolutions of the rotor 12.

Each of the 360° walls 40 localized in FIG. 3 in the constriction of the wall storage unit 32 has a change in the electrical resistance which is measurable between the contacts 26 in FIG. 3. The more 360° walls 40 are present in the constriction 33, the greater is the change in resistance, whereby each 360° wall 40 alters the resistance approximately by the same amount.

A change in resistance on the basis of a remagnetization, especially by a 360° wall 40 in constriction 33 is characteristic for a spin valve with GMR or TMR effect, and solely based on the arrangement of the directions of magnetization in the spin valve. The changes in the magnetization in the soft magnetic layer 21 require no sort of energy supply. Merely a sufficiently large magnetic field of the permanent magnets 13 moved past is necessary.

Only measuring the resistance and therewith the reading out of the counted revolutions requires an energy supply for the period of time for measuring resistance, in that, for example, the contacts 26 are receive a voltage. This way, the electrical resistance between the contacts 26 can be determined directly or indirectly. Due to the GMR or TMR effect, the change in resistance caused by the 360° wall is sufficiently large, so that each individual revolution of the rotor 12 can be registered. On the basis of the electrical resistance, the number of the 360° walls 40 in the constriction 33 can be inferred. The number of walls finally corresponds to the number of clockwise revolutions of the rotor 12.

If the rotor rotates counterclockwise, then a wall 40' (not represented) is generated whose magnetization rotates in the opposite direction in comparison to the wall 40. This wall 40' is transported into the constriction 33 of the wall storage unit 32 just as wall 40. There the wall 40' meets the existing wall 40. The reversed direction of rotation of the respective walls 40 and 40' results in the mutual extinguishing of walls 40 and 40'. The rotation of the rotor 12 in the opposite direction is therewith also taken into consideration in the number of walls 40 present in the constriction 33. The electrical resistance between the contacts 26 is therewith correspondingly altered so that the rotation of the rotor 12 in the opposite direction can be measured and recorded.

If no wall 40 is present in the constriction 33 of the wall storage unit 32, and if a wall 40' is generated by a counterclockwise rotation of the rotor 12, then this wall 40'—as was already explained in connection with the walls 40—is stored in the wall storage unit 32. This way the counterclockwise revolution, which took place is once again measurable through the electrical resistance. A clockwise rotation then again leads to the extinguishing of wall 40', as this was already described correspondingly.

Figure 5A:
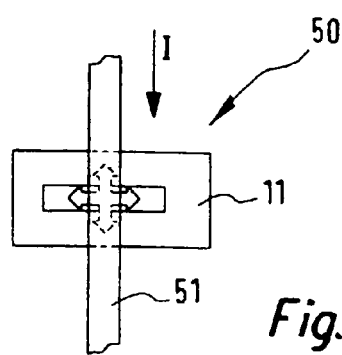
FIGS. 5a and 5b illustrate schematic block diagrams of embodiments of an electric circuit for the sensor elements of FIG. 1.

An electric circuit 50 is represented in FIG. 5*a*, in which an electrical conductor track 51 is laid over the sensor element 11, through which a current I can flow. This current I is selected such that the magnetic field generated by it prevents the sensor element 11 arranged under line 51 from building up 360° walls 40. The rotor 12 with the permanent magnets 13 can henceforth be rotated about any desired number of revolutions without this leading to a counting in the sensor element 11, and therewith in the revolution counter 10. This procedure can in particular be used with or after manufacture of the sensor element 11, or the revolution counter 10, or in connection with an initialization according to the incorporation of the revolution counter 10.

Figure 5B:
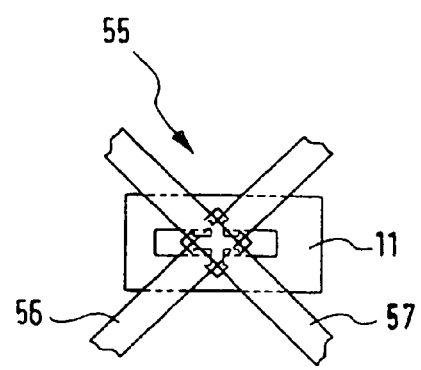

An electric circuit 55 is represented in FIG. 5*b* in which two electric conductor tracks 56, 57 are placed in an angle of approximately 90 degrees over the sensor element 11. Currents can flow through the two conductor tracks 56, 57 which together generate a rotating magnetic field. It is therewith possible to generate 360° walls 40 in the sensor element 11 with the aid of the aforementioned currents without a revolution of the rotor 12 with the permanent magnets 13 being necessary for this. This circuit can in particular also be used after incorporating the revolution counter 10 for setting it to a desired counter state.

Figure 6:
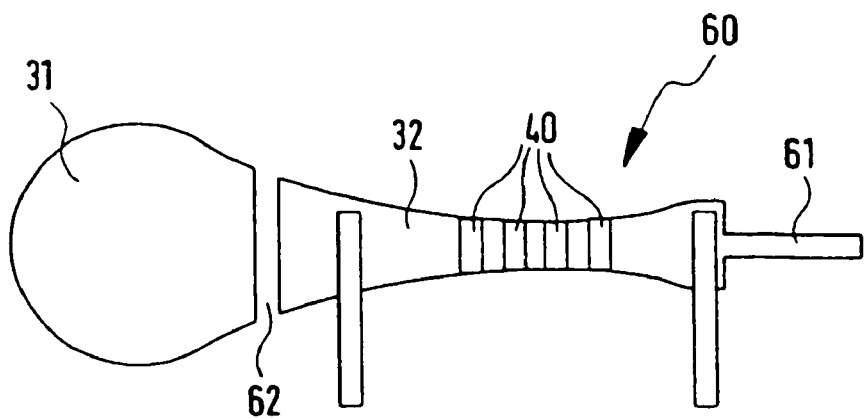
FIGS. 6 and 7 illustrate schematic top views on alternative embodiments of the sensor elements of FIG. 1.

A sensor element 60 is illustrated in FIG. 6 that represents an alternative embodiment of the sensor element of FIG. 3. A tip 61 is present in the sensor element 60 of FIG. 6, which is constructed as an elongated, thin strip. The possibility is therewith diminished that a 360° wall 40 is lost in the region of this tip 61.

Furthermore, a strip-like gap 62 between the wall generator 31 and the wall storage unit 32 is present with sensor element 60 of FIG. 6. This gap 62 can be bridged by the magnetic scatter field generated by the wall generator, so that in a like manner 360° walls 40 arise in the wall storage unit 32, as this was already described.

Figure 7:
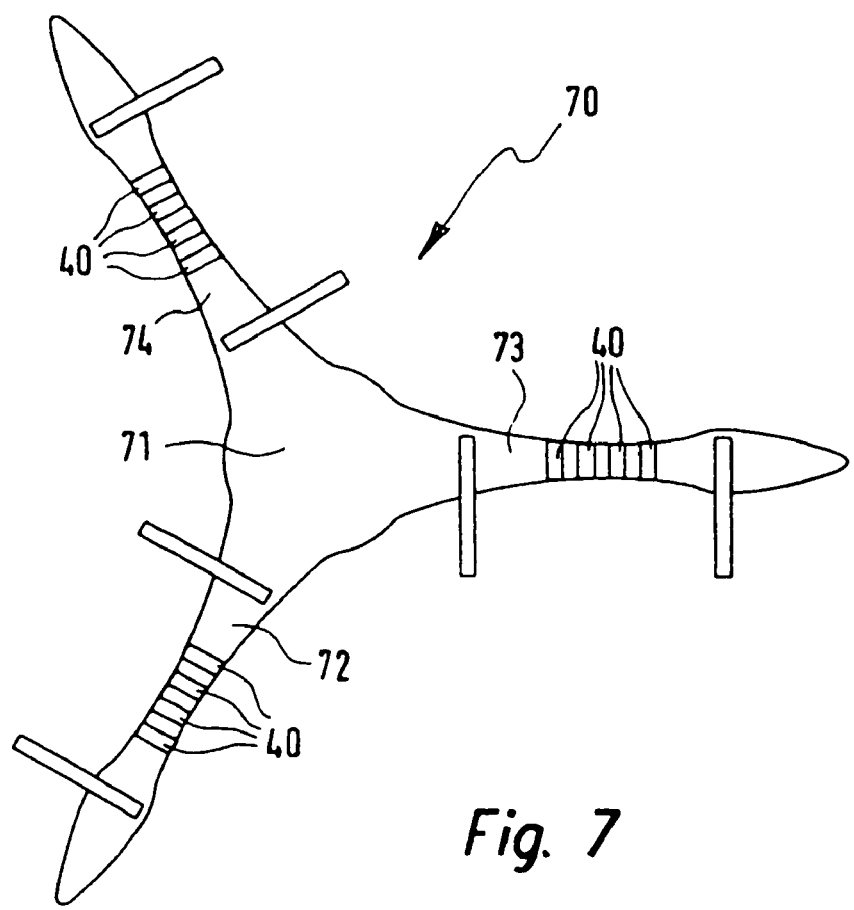

A sensor element 70 is illustrated in FIG. 7, which represents an extension of the sensor element in FIG. 3. The sensor element 70 in FIG. 7 has a single wall generator 71 which corresponds to the wall generator 31 of FIG. 3. Nonetheless three wall storage units 72, 73, 74 are allocated to this wall generator 71. These are, for example, arranged at an angle of respectively 120 degrees in relation to one another. The wall storage units 72, 73, 74 of FIG. 7 correspond to the wall storage unit 32 of FIG. 3 and are constructed alike.

With a rotation of the permanent magnets 13, 360° walls 40 are successively stored into the three wall storage units 72, 73, 74. Following each revolution of the rotor 12 with the permanent magnets 13, all three wall storage units 72, 73, 74 consequently have the same counter level. This redundancy can be used to recognize a defective wall storage unit 72, 73, 74. Thus the counter level which is indicated by at least two of the three wall storage units 72, 73, 74 can always be recognized as correct.

Three sensor elements 11 are represented in FIG. 1 past which the permanent magnets 13 are moved. In this way, it is possible to always exclude the one of the three sensor elements 11, which the permanent magnets 13 are passing at the time from an evaluation. This way, it is assured that no faulty counting can be read out from the sensor element 11 which the permanent magnets 13 are passing at the time. Expressed otherwise, it is guaranteed that an evaluation of the three sensor elements 11 is only conducted when no disturbance of the respective sensor element 11 due to the passing permanent magnets 13 can be present.

The respective angle ranges in which the individual sensor elements 11 must be masked out can be established in advance. These angular ranges can be measured by an angle sensor and therewith taken into consideration in operating the revolution counter 10. Such an angle sensor is, for example, usually present in connection with the steering shaft of a motor vehicle.

While one of the three sensor elements 11 is masked out, the respectively current revolution count can be determined with the aid of the two other sensor elements 11. Thereby a defective sensor element 11 can be recognized with the aid of a comparison of the determined revolution counts of all three sensor elements 11.

Interconnections of several sensor elements of this type can be used instead of the individual sensor elements 11, 60, 70 depicted in FIGS. 1 to 7. Thus it is possible to interconnect four sensor elements 11, 60, 70 in a Wheatstone bridge. The revolution counter 10 of FIG. 1 would then have three such Wheatstone bridges with respectively four sensor elements.

So that revolutions can be counted in both directions and this way a clear differentiation between clockwise and counterclockwise can be made, it is advantageous to detune the Wheatstone bridges selectively. There exist the following preferred configurations for detuning of the Wheatstone bridge. At most 2n revolutions can be counted in the four sensor elements of the Wheatstone bridge. As a starting configuration, n revolutions are stored in each sensor element, whereby the direction of rotation for every two sensor elements diagonally opposed is counterclockwise, and for the other two sensor elements diagonally opposed clockwise. Since the magneto-resistive additional resistors of the stored 360° walls are largely identical and independent of the direction of rotation of the wall, the bridge is equilibrated in this state. The change in magnetization caused by the outer magnetic field takes place in each sensor element in the identical direction of rotation. Adding a 360° wall changes the electrical resistance in all sensor elements equally. The detuning of the bridge only takes place in that one 360° bridge per revolution each is added in two diagonally opposite sensor elements, and in the other two sensor elements, one 360° wall each is removed. The removal of a wall takes place through a meeting of two walls with different direction of rotation, owing to which these extinguish each other. After a counterclockwise revolution, n+1 360° walls with counterclockwise direction of rotation are stored in two diagonally opposed sensor elements, and n−1 360° walls with a counterclockwise direction of rotation are stored in the other two sensor elements. The bridge has consequently been detuned by the difference in resistance of two 360° walls. With a counterclockwise revolution, the difference in resistance is identical, but the potential difference in the detuned bridge has another sign, since the addition and removal takes place exactly in reverse. That is, revolutions counted counterclockwise and clockwise can unambiguously be differentiated. The maximum countable number in revolutions is n, whereby in two diagonally opposed sensor elements, the number of stored 360° walls is counted up from n to 2n, and is counted down from n to 0 in the other two sensor elements.

In another configuration in accordance with the invention, at most 2n revolutions can be counted in the four sensor elements of the bridge. In each sensor element, n revolutions with the same direction of rotation are stored as a starting configuration. The change in magnetization caused by the outer magnetic field takes place for two diagonally opposed sensor elements each with a clockwise direction of rotation, and for the other two diagonally opposed sensor elements with a counterclockwise direction of rotation. The addition of a 360° wall changes the electrical resistance equally in all directions. This way, one 360° wall each is added per revolution in two diagonally opposed sensor elements, and one 360° wall each is removed in the other two sensor elements.

At most n revolutions can be counted in the sensor elements in a further configuration. As a starting configuration, no revolutions are stored in each sensor element. The counting of a revolution increases the electrical resistance in these sensor elements in two diagonally opposed sensor elements, while counting a revolution in the other diagonally opposed sensor elements diminishes the electrical resistance. Therefore it is necessary to set the orientation of the magnetizations of the two magnetic layers or layer stacks in the GMR system or the TMR system parallel for one half-bridge, and anti-parallel for the other half-bridge. The advantage of this configuration lies in the fact, that only n instead of 2n storage places for 360° walls are to be provided for storing a maximum of n revolutions. The relative change in resistance per 360° wall, and therewith the measuring signal is consequently greater than in the other two configurations.

In order to be able to set the above starting configuration, preferred configurations provide one or more conductor tracks through the sensor elements, especially through the wall generators. These conductor tracks in the final analysis correspond to the conductor tracks 51, 56, 57, which were explained in connection with FIGS. 5a and 5b. Rotating magnetic fields can be generated as needed through these conductor tracks with the aid of currents or current impulses which are counted as revolution only in the respective sensor element, which thus do not alter the magnetization in the adjacent sensor elements of the Wheatstone bridge. For example, the corresponding number of 360° walls of the start configuration is written into the sensor elements, which count the revolutions using the number of 360° walls. Especially preferred configurations provide two crossed conductor tracks each over the wall generators to generate the rotating magnetic field in a simple manner.

These advantageous configurations permit resetting the sensor element of the invention and therewith the revolution counter into the starting configuration at any time, for example when it was exposed to a high noise field.

The sensor element 11, or its modifications 60, 70, or interconnections of this can also be used in connection with linear or curved inductive displacement pick-ups instead of the revolution counter 10 illustrated in FIG. 1 in which, for example, one or several permanent magnet(s) is/are present at equidistant spacings. In this case, respectively one 360° wall is stored in the sensor element during passing by, whereby the number of walls indicates the position.

The ivention claimed is:

1. A sensor element, whereby a magnetic field and the sensor element are movable relative to each other, the sensor element comprising:
    a laminated structure having a shape suitable to cause a change in magnetization in the sensor element without an energy supply if the magnetic field moves relative to the sensor element, and to store several such changes.

2. The sensor element according to claim 1, wherein the change results in a domain wall arising in the sensor element if the magnetic field moves relative to the sensor element.

3. The sensor element according to claim 1, wherein the laminated structure has at least one soft magnetic layer, at least one non-magnetic metal layer or at least one insulation layer, and at least one hard magnetic layer in sequence upward or downward.

4. The sensor element according to claim 3, wherein one of
    at least one anti-ferromagnetic layer is arranged on an uppermost or undermost hard magnetic layer;
    at least one non-magnetic metal layer and at least one hard magnetic layer are arranged on the uppermost or the undermost hard magnetic layer, which together with the hard magnetic layer form an artificial anti-ferromagnetic layer; and
    at least one non-magnetic metal layer and at least one hard magnetic layer are arranged on the uppermost or the undermost hard magnetic layer, which together with the hard magnetic layer form an artificial anti-ferromagnetic layer.

5. The sensor element according to claim 1, wherein the shape of the laminated structure has at least one first region designated as wall generator and at least one second region designated as a wall storage unit.

6. The sensor element according to claim 5, wherein the wall generator is constructed in such a way, that the magnetization in the wall generator follows the magnetic field moving relative to the sensor element.

7. The sensor element according to claim 5, wherein the wall generator is basically circular in shape.

8. The sensor element according to claim 5, wherein the wall storage unit is constructed in such a way, that the magnetization in the wall storage unit is basically not altered by the magnetic field moving relative to the sensor element.

9. The sensor element according to claim 8, wherein the wall storage unit is constructed to be elongated.

10. The sensor element according to claim 8, wherein the wall storage unit has at least one constriction.

11. The sensor element according to claim 8, wherein the wall storage unit has at least one locally restricted change in the magnetic properties.

12. The sensor element according to claim 11, wherein at least one locally restricted hard magnetic layer is provided to call forth the at least one locally restricted change in the magnetic properties of the wall storage unit.

13. The sensor element according to claim 8, wherein the wall storage unit has at least two contacts.

14. The sensor element according to claim 10, wherein the wall storage unit has two contacts for each one of the at least one constriction.

15. The sensor element according to claim 11, wherein the wall storage unit has two contacts for each one of the at least one locally restricted change.

16. The sensor element according to claim 5, wherein a region of the shape connecting the wall generator and the wall storage unit is wedge-shaped.

17. The sensor according to claim 5, wherein the wall storage unit has a tip on an end opposite the wall generator.

18. The sensor element according to claim 5, wherein the wall storage unit is covered with a covering layer.

19. The sensor element according to claim 5, wherein several wall storage units are allocated to a single wall generator.

20. The sensor element according to claim 1, wherein at least one electric conductor track is laid over the sensor element.

21. The sensor element according to claim 1, wherein a number of stored changes of magnetization is determined using at least one of the Giant Magneto Resistance (GMR) effect, the Tunnel Magneto Resistance (TMR) effect, and a magneto-optical method, and a magneto-strictive method.

22. The sensor element according to claim 5, wherein the wall storage unit has at least two contacts, and the electrical resistance between the at least two contacts changes as a function of a number of stored changes in the wall storage unit.

23. The sensor element according to claim 1, wherein the sensor element is included in a Wheatstone bridge.

24. A revolution counter including at least one sensor element according to claim 1.

25. The revolution counter according to claim 24, wherein the magnetic field is generated by at least one permanent magnet.

26. The revolution counter according to claim 24, wherein the at least one sensor element is a plurality of sensor elements and the plurality of elements are arranged in approximately equal angular distances from one another.

27. The revolution counter according to claim 24, wherein the revolution counter is used in a motor vehicle, and the magnetic field is coupled with a steering shaft of the motor vehicle.

28. The sensor element according to claim 10, wherein the wall storage unit also has at least one locally restricted change in the magnetic properties.

29. The sensor element according to claim 28, wherein the at least one locally restricted change is arranged in the at least one constriction.

30. The sensor element according to claim 28, wherein the wall storage unit has at least two contacts and each of the at least one constriction and the at least locally restricted change is arranged between the at least two contacts.

* * * * *